Oct. 24, 1950 — W. O. TAIT — 2,526,709

FLUID OPERATED MOTOR VALVE

Filed Nov. 29, 1945

INVENTOR
WILLIAM O. TAIT
BY
Herbert H. Thompson
his ATTORNEY.

Patented Oct. 24, 1950

2,526,709

UNITED STATES PATENT OFFICE 2,526,709

FLUID OPERATED MOTOR VALVE

William O. Tait, Garden City, N. Y., assignor to The Sperry Corporation, a corporation of Delaware Application November 29, 1945, Serial No. 631,586

3 Claims. (Cl. 121—46.5)

The present invention relates to sensitive positional control apparatus, and is particularly concerned with positional control apparatus suitable for control valves of the type used in servo systems.

Fluid operated servo systems often include a fluid sump or reservoir, a pump for providing circulation of the fluid, and an hydraulic motor activated by the circulating fluid and employed to supply motive power to the load. The motor may be arranged as a reversible motive unit, its direction of operation being dependent upon the direction of fluid flow therethrough.

Servo systems have been provided with valves having multiple control surfaces on a positionable piston-like body or spool for admitting fluid under pressure to the motor and for permitting the exhaust of fluid from the motor, the rate of fluid flow through the valve and the direction of fluid flow through the motor being determined by the extent and direction of displacement of a movable valve control member. Such systems are often employed for the transmission of appreciable power, by the use of very high-pressure fluid flowing at a high fluid speed. Accordingly, the forces due to Bernoulli effect acting upon the positionable valve spool may be appreciable. In those systems where it is desired to position the valve spool by the application of a very small force, the Bernoulli effect acting upon the valve spool, when displaced from its neutral position, renders sensitive and accurate positional control of the valve spool extremely difficult of attainment.

In accordance with a feature of the present invention, apparatus is provided which effects the positional control of the valve spool according to the position of a control member which, if desired, may be rendered substantially free from the influence of reactionary forces caused by the rapid fluid flow through the valve ports.

It is an object of the present invention to provide improved sensitive positional control apparatus.

It is another object of the present invention to provide an improved servo control system including sensitive and positive fluid valve apparatus.

It is yet another object to provide sensitive valve apparatus of simplified construction.

A further object is to provide a sensitive valve system wherein a movable control element may be made substantially reaction-free or may be constructed for any desired control characteristics.

The invention in another of its aspects relates to novel features of the instrumentalities described herein for achieving the principal objects of the invention and to novel principles employed in those instrumentalities, whether or not these features and principles are used for the said principal objects or in the said field.

A further object of the invention is to provide improved apparatus and instrumentalities embodying novel features and principles, adapted for use in realizing the above objects and also adapted for use in other fields.

Further objects and features of the present invention will become apparent from the following detailed description, considered with reference to the accompanying drawing, wherein.

Life reference numerals are employed to designate corresponding parts in the different views.

Figure 1:
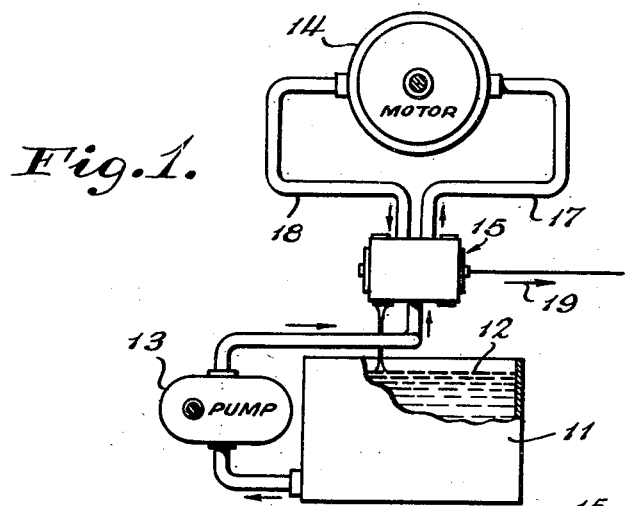
Fig. 1 is a schematic illustration of a fluid-operated motive system including a reversible motor controlled in direction and speed according to the position of a valve control element.

In Fig. 1 is shown a fluid sump or reservoir 11 containing a supply of motive fluid 12 such as highly refined servo oil. A pump 13 which may be driven by a prime mover (not shown) is connected to the sump 11 and arranged to cause the circulation of the fluid 12 therefrom for driving a reversible fluid-operated motor 14.

A valve 15, having a linearly movable valve control element 28, is provided intermediate the pump 13 and motor 14 for controlling the flow of the motive fluid through the motor 14. The valve 15 may be so arranged as to prevent the flow of fluid 12 through motor 14 when the control element 28 is neutrally positioned; and to permit the flow of fluid from pump 13 therethrough into a first conduit 17 leading to motor 14 and also to permit the flow of exhaust fluid from motor 14 through conduit 18 and valve 15, into the sump 11 when the control element 28 is displaced from its neutral position in the direction indicated by the arrow 19. The valve 15 may be so constructed that upon the displacement of the control member 28 in the opposite direction from its neutral position, the high pressure oil from pump 13 may be routed through conduit 18 into motor 14, and thence exhaust fluid may be allowed to pass from the motor through conduit 17 and through the valve 15, into the sump 17, the direction of operation of the motor 14 being thereby reversed in accordance with the reversed direction of displacement of control element 28 from its neutral position.

Figure 2:
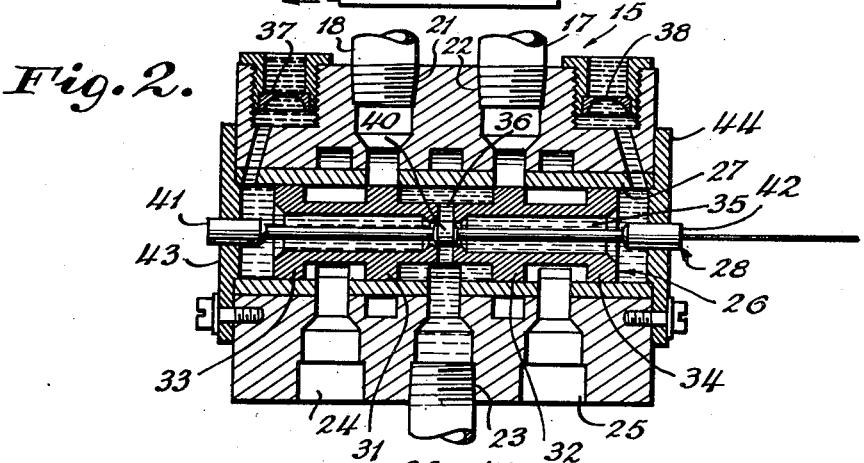
Fig. 2 is a sectional view of a control valve constructed in accordance with the present invention.

Referring now to Fig. 2, valve apparatus 15 is shown in a sectional view, which illustrates the internal arrangement of the valve apparatus for providing control not only of the motor intake fluid but also of the motor exhaust fluid, in such a way that a single valve unit may be employed for full control of the reversible motor.

The valve apparatus 15 comprises a housing having a pair of motor connection ports 21 and 22, a high-pressure fluid inlet port 23, and a pair of exhaust fluid discharge ports 24 and 25. Each of these five ports leads to an annular passage surrounding a bore through the housing provided for the movement therein of a valve control spool 26. The valve spool 26 comprises a piston-like, metallic body having a plurality of annular lands or enlarged-diameter portions arranged for co-operating with the annular passages in the housing for controlling the flow of motive fluid to and from the fluid-operated motor. The bore for receiving the valve spool 26 may be provided directly in the housing, or an intermediate valve sleeve 27 may be provided, as shown, for convenience in manufacture. This sleeve may be fixedly positioned, or may be given a regular motion, such as rotation, for overcoming static friction. In the type of valve usually employed in fluid-operated servo systems, the spool 26 has been operated directly by a positional control member rigidly connected to the spool 26 and extending through the end of the housing.

In accordance with an important feature of the present invention, the high-pressure fluid supplied to the valve apparatus 15 through intake opening 23 is employed for maintaining the valve spool 26 in positional alignment with a miniature control rod 28 extending through a longitudinal passage through the valve spool 26.

The valve spool 26 has two annular lands 31 and 32 which are normally aligned with the motor fluid ports or openings 21 and 22, and two further lands 33 and 34 substantially at the ends of the spool. When the valve spool 26 is neutrally positioned within the housing, as shown in Fig. 2, the lands 31 and 32 block ports 21 and 22, and thus prevent the flow of high-pressure oil from port 23 to the motor 14, at the same time preventing the exhaust of fluid from the motor 14 through the valve 15. If the valve spool 26 is displaced to the right, high-pressure fluid is permitted to flow through the annular space between lands 31 and 32, through port 22 and thence to the fluid-operated motor, and the exhaust fluid from the motor is conducted through port 21 and the annular space between lands 31 and 33 to exhaust port 24, returning thence to the fluid sump. Because of the Bernoulli effect, this fluid, rapidly flowing in two simultaneous courses through the valve apparatus 15, tends to return the valve spool 26 toward its neutral position. Accordingly, where direct positional control of the valve spool 26 is employed, appreciable force must be exerted thereon by the valve controlling apparatus in order that the position of the valve spool be determined positively and independently of the fluid-flow reaction thereon.

If the valve spool 26 is displaced to the left from its neutral position, then a high pressure fluid path is completed between inlet 23 and motor connection port 21, and an exhaust fluid path is provided between the motor connection port 22 and exhaust port 25. Thus, it is clearly seen that the direction of fluid flow through a connected motor 14 (Fig. 1) may be reversed by a reversal of the direction of displacement of the valve spool 26 from its neutral position relative to the housing.

In accordance with a principal feature of the present invention, a very simple and economical indirect control system is provided in the valve apparatus 15. A passage 35 is bored longitudinally through the valve spool 26, and a control rod 28 is arranged therein for controlling the admission of high-pressure fluid from port 23 to the passage 35. A constriction is provided in the middle portion of passage 35, and one or more radial passages 36 are provided for fluid communication between the high-pressure inlet 23 and passage 35 at the middle of the valve spool 26. An annular land 40 is provided at the middle of control rod 28 for blocking passages 36 when control rod 28 is neutrally positioned with respect to the valve spool 26, and for permitting the flow of high-pressure fluid toward one end of the housing when land 40 of the control rod 28 is displaced in the direction toward the opposite end of the valve spool 26. Openings 37 and 38 are provided at the ends of the housing 16 for permitting the exit of fluid from the ends of the valve bore. Each of these openings is provided with a restrictive diaphragm orifice or other flow-resistive element for impeding the exit of fluid from the ends of the valve bore.

When the control rod 28 is neutrally positioned relative to the valve spool 26, the land 40 at the middle of the control rod 28 blocks the entry of high-pressure fluid into the longitudinal passage 35. Accordingly, no force acts on valve spool 26 to change the position thereof within the housing. If the control rod 28 is displaced to the right, however, the land 40 at the middle thereof, while preventing the admission of high-pressure fluid into the right-hand part of the longitudinal passage 35, does admit the high-pressure fluid to the left-hand part of passage 35, and therethrough to the left-hand end of the valve bore. The high-pressure fluid flows thence through the restrictive orifice 37, but due to the flow impedance of the orifice, appreciable fluid pressure in the left-hand end of the valve bore acts upon the left-hand end of valve spool 26, urging the valve spool to move to the right.

Assuming that the valve has been in operation for some time, having been operated throughout the range of movement of valve spool 26, the right-hand end of the valve bore will contain a residual quantity of fluid. This residual fluid is allowed to escape through orifice 38 as valve spool 26 is moved to the right, and thus is prevented by the right-hand restrictive orifice 38 from developing sufficient back-pressure against the right-hand end of valve spool 26 to prevent its movement. Thus, the valve spool 26 on moving to the right displaces the residual fluid from the right-hand end of the valve bore. The valve spool 26 is moved to the right until passage 36 is again aligned with the control land 40 at the middle of control rod 28, at which time the condition of equilibrium of forces acting on spool 26 is restored.

Upon movement of the control rod 28 to the left, the high-pressure fluid from inlet 23 is admitted to the right-hand end of the valve bore, and the valve spool 26 is thereby urged to the left, until neutral positional alignment is again restored between the valve spool 26 and control rod 28. The orifices 37 and 38 serve not only to provide the required impedance to the flow of high-pressure fluid from the valve bore end opposite the end toward which the middle end of control rod 28 is displaced, and to permit the displacement of residual fluid from the opposite end of the valve bore; but also, these orifice restrictions dissipate energy during the movement of the valve spool 26 within the valve bore and thereby serve to damp the movement of the spool, preventing it from going through a series of oscillations about the position of neutral alignment with the control rod 28 following a shift in the position of the control rod.

As will be apparent from an inspection of Fig. 2, the control rod 28 is provided with enlarged-diameter portions 41 and 42 at the left and right ends thereof, arranged for movement within conformal axial passages through the end plates 43 and 44 of the housing. The diameter of these portions 41 and 42 of the rod 28 may be equal to the diameter of the middle land of the control rod 28, as illustrated in Fig. 2. With this construction, when high-pressure fluid is admitted to one end of the longitudinal passage 35 through the control spool 26, this high-pressure fluid acts with equal forces to the right and to the left on the control rod 28, so that a net cancellation or neutralization of the forces thereon due to the high-pressure fluid is afforded. The control may thus be made substantially free from reaction thereon due to fluid pressure acting during the interval of relative displacement between the valve spool 26 and the control rod 28.

Figure 3:
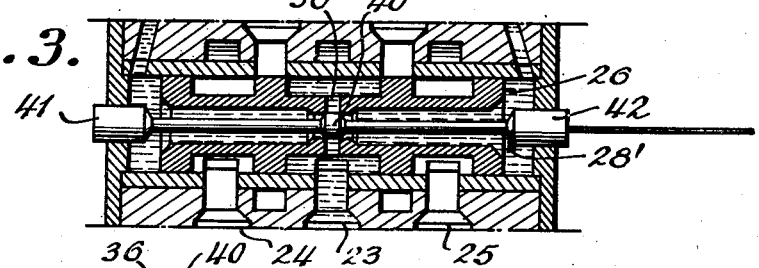
Figs. 3 and 4 are fragmentary views showing variations of constructional details of the control valve apparatus illustrated in Fig. 2.

If the diameter of the ends of the control rod 28 is greater than the diameter of the fluid control land 40 at the middle thereof, as in a modified control rod 28′ shown in the fragmentary view in Fig. 3, then upon the displacement of the control rod 28′ from a neutral position relative to the valve spool 26, an appreciable net force acts upon the control rod 28′ tending to restore it to neutral alignment with the valve spool 26.

If, for example, the control rod 28′ having relatively large-diameter ends is displaced to the right, so that the high-pressure fluid is admitted to the left-hand end of the valve bore, then this fluid, acting upon the relatively large cross-sectional area at the left-hand end of control rod 28′, exerts a greater force thereon tending to move rod 28′ to the left, than the force exerted upon the smaller cross-sectional area of the control land 40, so that the fluid admitted to the left-hand end by movement of control rod 28′ to the right urges the control rod to the left, tending to restore control rod 28′ to the position of neutral alignment with the control spool 26.

Figure 4:
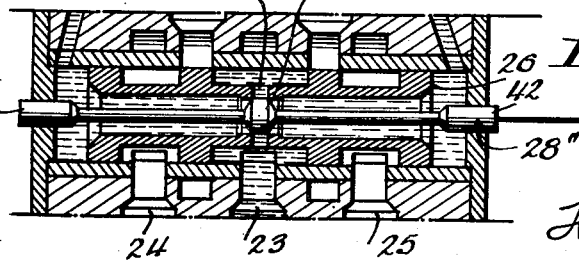

If the diameter of the control land 40 at the middle of a modified control rod 28″ is made greater than the diameter of the end portions thereof, as illustrated in Fig. 4, then, upon displacement of the control rod 28″ relative to the valve spool, the difference of the high-pressure fluid forces acting upon the end and the middle of the control rod tends to cause instability in its positional characteristics. Upon a small displacement of the control rod 28″ relative to the valve spool, the high-pressure fluid urges the control rod 28″ in the direction of increased displacement. A regenerative action is thus provided, the control rod 28″, when neutrally positioned relative to valve spool 26, being in a condition of unstable equilibrium.

It will be readily seen from the foregoing description of the present invention that accuracy and reliability are provided in a simple and easily constructed positional control apparatus especially adapted for positioning the spool of a servo valve apparatus. The valve spool and control rod comprehended by the invention are readily produced by extremely simple machine operations. The effective force amplification may be made as great as desired by making the diameter of the control rod very small compared to the diameter of the valve spool. In addition, the control rod may be made substantially free from fluid-pressure reactions accompanying relative displacement between the control rod and the valve spool, or it may be made either self-aligning or unstable (regenerative), by suitable choice of relative diameters of the middle control land and the slidable bearing ends of the control rod. Fluid valving is accomplished at only one point for the positional control of the valve spool, the restrictive orifices at the ends of the valve housing supplementing the control of the valve-spool positioning fluid for stabilized follow-up action of the positionable valve spool.

The damping of movement of the piston-like member or valve spool, and its speed of positional response to the relative displacement of the control rod, may readily be varied by a change of the restriction of the orifices in the ends of the housing. Smaller-diameter orifices may be introduced for increased damping or for increased lag of the piston-like member behind the movement of the control rod. If frequent changes of the follow-up characteristics of the positionable, piston-like member or valve spool are desired, continuously adjustable needle valves may be substituted for the fixed orifices illustrated.

While the present invention is principally suited for the positional control of a servo fluid valve of the type controlling both the intake fluid to and the exhaust fluid from a fluid-operated motive unit such as an hydraulic motor or ram, it will be readily apparent that it could be employed for positional control of a piston-like body in the bore of a housing, for any other purpose which may require a structure of this class.

Since many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

What is claimed is:

1. Sensitive positional control apparatus comprising a housing having a restrictive fluid discharge opening at each end thereof, and also having a fluid inlet port, a piston-like member linearly movable in said housing between the ends thereof, said piston-like member having a first passage therethrough for receiving a control rod and also having a second passage for admitting fluid from said inlet port to said first passage, said housing having passages in the ends thereof in substantially parallel alignment with said first passage, and a control rod in said first passage movable with respect to said piston-like member and with respect to said housing, said control rod having an enlarged diameter portion at each end thereof slidably fitting within said housing end passages, and also having an enlarged diameter portion intermediate said ends for selectively controlling the admission of fluid from said second passage to said first passage, the diameter of said intermediate portion being unequal to the diameters of the end portions, said intermediate enlarged diameter portion being adapted to prevent the flow of fluid from said second passage when aligned with said second passage and to permit the flow of fluid from said second passage toward one end of said first passage when said control rod is moved toward the opposite end of said first passage, whereby a difference of pressures exerted upon the ends of said piston-like members upon relative movement of said control rod and said piston-like member induces said piston-like member to follow the movement of said control rod.

2. Apparatus as defined in claim 1, wherein the diameter of said intermediate enlarged diameter portion of said control rod is smaller than the diameters of said other enlarged diameter portions thereof.

3. Apparatus as defined in claim 1, wherein the diameter of said intermediate enlarged diameter portion of said control rod is larger than the diameter of said other enlarged diameter portions thereof.

WILLIAM O. TAIT.

REFERENCES CITED

The following references are of record in the file of this patent:

UNITED STATES PATENTS

| Number | Name | Date |
|---|---|---|
| 734,285 | Thomann | July 21, 1903 |
| 2,107,357 | Wood | Feb. 8, 1938 |
| 2,317,383 | Hull | Apr. 27, 1943 |
| 2,343,375 | Herman | Mar. 7, 1944 |